United States Patent [19]

Isler

[11] Patent Number: 5,301,995
[45] Date of Patent: Apr. 12, 1994

[54] ADJUSTABLE BOW FOR A TRUCK TONNEAU COVER

[76] Inventor: Mark Isler, 8447 Tod Ave., Lordstown, Ohio 44481

[21] Appl. No.: 994,359

[22] Filed: Dec. 21, 1992

[51] Int. Cl.$^5$ .............................................. B60P 7/02
[52] U.S. Cl. .................................... 296/100; 296/104; 296/118
[58] Field of Search ................ 296/100, 104, 118, 119

[56] References Cited

U.S. PATENT DOCUMENTS

| | | | |
|---|---|---|---|
| 2,565,746 | 8/1951 | Turner | 296/104 |
| 3,894,766 | 7/1975 | Woodward | 296/104 |
| 4,479,677 | 10/1984 | Gulette et al. | 296/98 |
| 4,792,178 | 12/1988 | Kokx | 296/98 |
| 5,000,507 | 3/1991 | Baxter | 296/104 |

*Primary Examiner*—David M. Mitchell
*Assistant Examiner*—Andrew C. Pike
*Attorney, Agent, or Firm*—Harpman & Harpman

[57] ABSTRACT

An adjustable bow for a tonneau cover assembly used on a pick-up truck to provide support for a lightweight removable cloth cover for the truck bed. The tonneau cover assembly has an aluminum perimeter frame secured to the truck bed with multiple support bows extending transversely across to support and elevate the cloth tonneau cover that is secured to the perimeter frame by multiple snap fasteners.

4 Claims, 2 Drawing Sheets

ADJUSTABLE BOW FOR A TRUCK TONNEAU COVER

BACKGROUND OF THE INVENTION

1. Technical Field

This device relates to truck tonneau covers that use a lightweight perimeter frames around the truck bed over which is stretched a canvas cloth material. Support bows are used to raise and support the canvas cover between the frame supports transversely across the bed.

2. Description of Prior Art

Prior art devices of this type have relied on a variety of different structural configurations to support and extend the cloth tonneau cover over the truck bed, see for example U.S. Pat. Nos. 4,419,677, and 4,792,178.

Other examples of adjustable bow supports found in related areas are U.S. Pat. Nos. 2,565,746 and 3,894,766.

In U.S. Pat. No. 4,479,617 a pick-up truck tonneau cover can be seen wherein a cover is stored within a housing positioned at the forward end of the truck bed. Cross bows are disclosed extending transversely over the bed and are held in place within registration slots formed in the side rails secured to the side walls of the truck bed.

U.S. Pat. No. 4,792,178 is directed towards a tonneau cover assembly in which the cover is dispensed from a storage roll and is guided within opposing guide tracks positioned on the side walls of the truck bed.

U.S. Pat. No. 2,565,746 shows a support frame for a truck body cover that defines a frame work over which a water-proof tarpaulin is secured. Multiple tubular bows are formed from two part construction using a center crown part to join same together at their apex. The ends of the respective tubular bows are telescopically adjustable within registering openings in the crown part through aligned apertures and placement pins positioned therein.

U.S. Pat. No. 3,894,766 is drawn towards a cargo carrying vehicle which shows a two-part structure for flat bed trucks with a telescopically length adjustable bow assembly extending therebetween. The bow ends use right angularly extending pins movable in a longitudinal slot and registerable in spaced notches within the slots for extension adjustment.

SUMMARY OF THE INVENTION

An adjustable bow assembly for use with a tonneau cover assembly on a pick-up bed that encloses the bed portion with a water-proof cover. The adjustable bow assembly has pairs of incrementally adjustment elements extending from opposite ends that allow for relative length adjustment of the bows between supporting frame on the truck bed. The relative tension of the bow defines the deflection of the bow and thus the ark over which the cover is stretched to repel water.

DESCRIPTION OF THE PREFERRED EMBODIMENT

Figure 5:
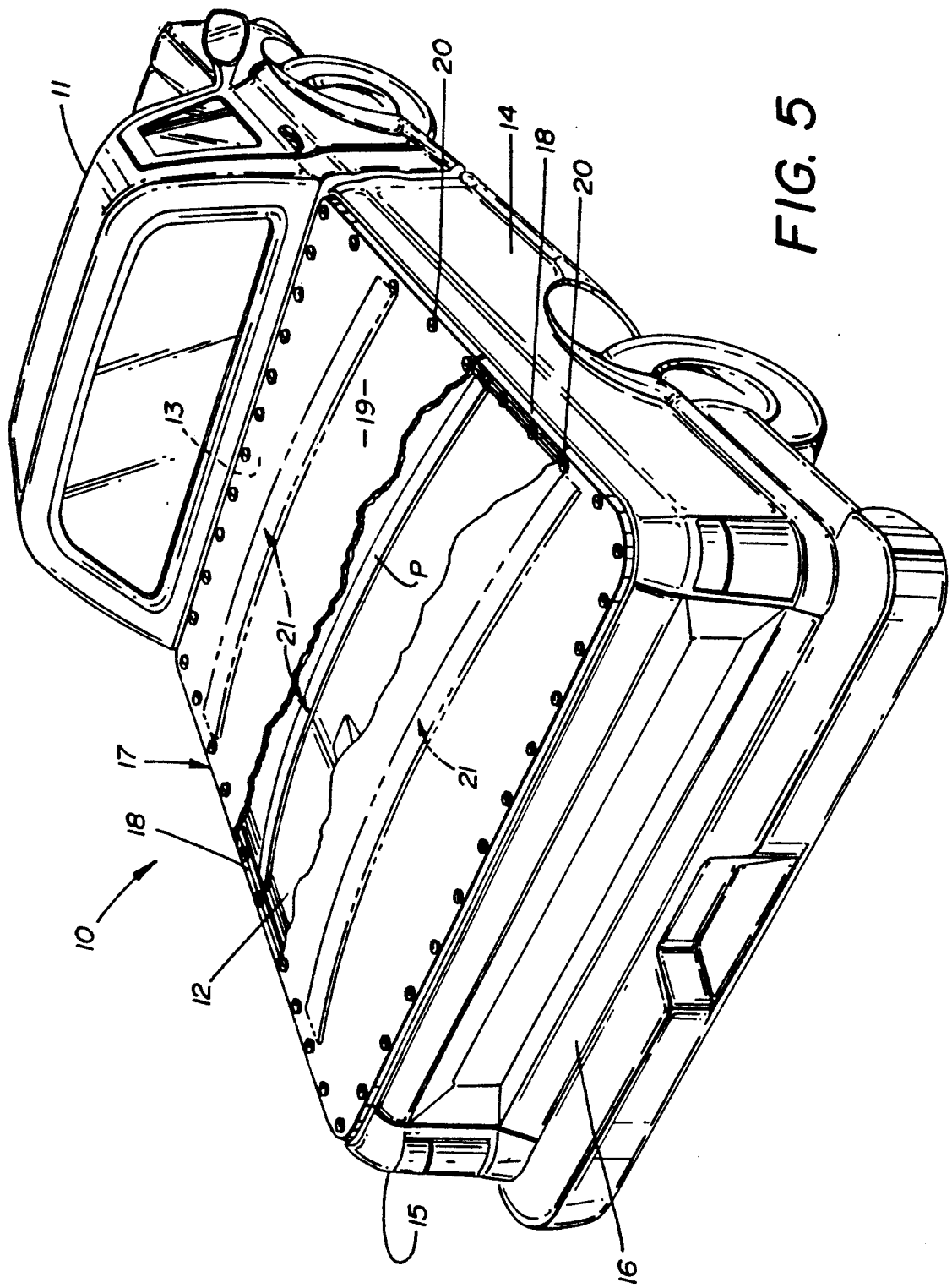
FIG. 5 is a perspective view of a pick-up truck with a tonneau support frame, adjustable bows, and cover installed with portions broken away for bow position clarity and frame detail.

Referring to FIG. 5 of the drawings, a pick-up truck 10 can be seen having a cab portion 11 and a bed portion 12. The bed portion 12 has a front wall 13, oppositely disposed spaced side walls 14 and 15 and a tailgate 16 as will be well understood by those skilled in the art. A tonneau cover assembly 17 can be seen having a rectangular support frame 18 positioned about the perimeter top edge of said truck bed walls and a fabric cover 19 secured to said frame via multiple longitudinally spaced two-part snap fasteners 20 secured to said frame 18 and the perimeter edge of said fabric cover 19 for registerable engagement.

Figure 1:
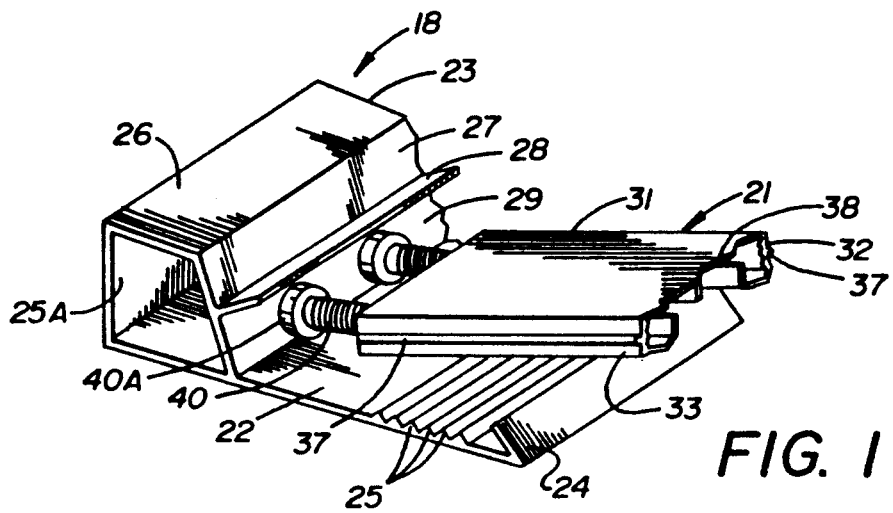
FIG. 1 is a perspective view of a portion of a tonneau cover support frame with adjustable bows positioned within.

A number of cover support bows 21 are adjustably positioned on said support frame 18 on opposing side walls 14 and 15. The cover support bows 21 are positioned between said respective support frame portions under tension which causes them to ark upwardly against the cover material 19, raising same. Referring now to FIGS. 1-4 of the drawings, a portion of the support frame 18 on the respective side walls 14 and 15 can be seen formed of a metal extrusion having an elongated base 22 and enclosed channel area 23 and a oppositely disposed upstanding angular flange 24 defining an inside perimeter edge. The base 22 has a plurality of parallel ribs 25 extending longitudinally of said base inwardly of said upstanding angular flange 24 as best seen in FIGS. 1 and 3 of the drawings. The enclosed channel portion 23 has a vertical outer side wall 25a, an integral inclined top 26 extending at right angles therefrom and a first angular descending interior wall 27 extending from said top 26 to an elongated angular flange element 28 that extends at right angles therefrom. A second angularly disposed descending wall 29 extends from and is integral with said flange element 28 intersecting at 30 with said base 22, thus defining the enclosed channel portion 23 hereinbefore described.

Figure 4:
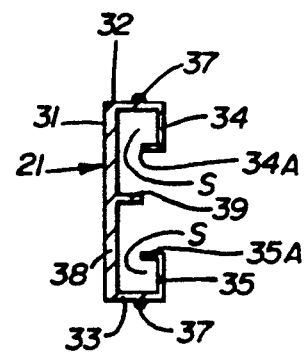
FIG. 4 is a cross-section on lines 4—4 of FIG. 2.

Each of the cover support bows 21 comprises an elongated extruded rail section 31 having a first side wall 32 and a second side wall 33 spaced in parallel relation thereto. Both of said side walls 31 and 32 are of an equal height and length and have elongated reinforcing ribs 3 extending outwardly therefrom. A transverse wall 38 interconnects the side walls 32 and 33 forming a cross-sectionally generally U-shaped configuration. The first side wall 32 terminates in a transversely inwardly directed flange 34, having a return flange 34A and second side wall 33 terminates in a transversely inwardly directed flange 35 having a secondary return flange 35A which define spaced mounting channels S as best seen in FIG. 4 of the drawings. The transverse wall 38 has an inwardly projecting rib 39 positioned midway between said first and second side walls 31 and 32.

A pair of threaded adjustable extension elements 40 are secured in each oppositely disposed end of said bow 21 via said respective mounting channels S formed by the side walls 32 and 33 and flanges 34, 34A and 35, 35A hereinbefore described.

Figure 2:
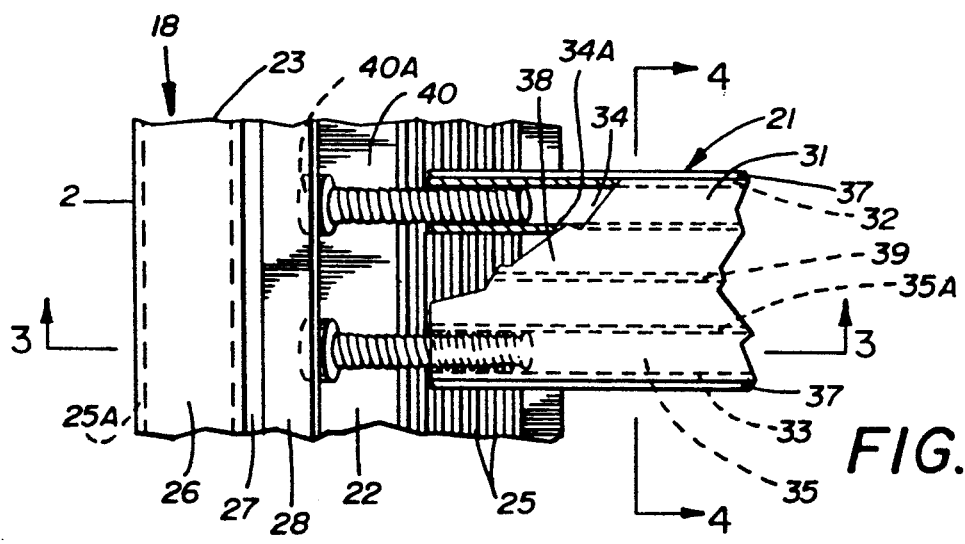
FIG. 2 is an enlarged top plan view of a portion of a tonneau support frame and adjustable bow with a portion broken away.
Figure 3:
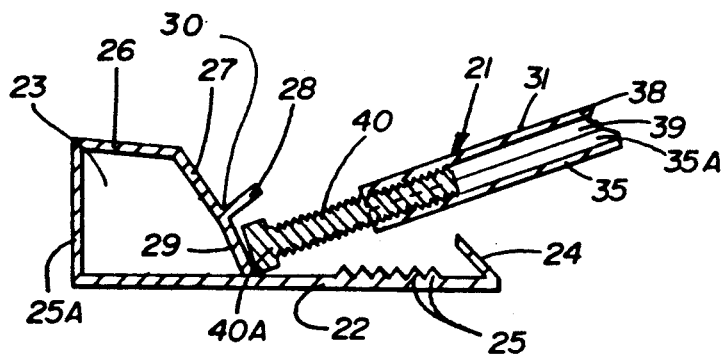
FIG. 3 is a cross-sectional view on lines 3—3 of FIG. 2.

The adjustable extension elements 40 are self-tapping within the mounting channel S as best seen in FIGS. 2 and 3 of the drawings and allow for incremental longitudinal length adjustment of the bow 21 by rotation within the respective mounting channels S by a slotted head 40A on the respective free ends of said extension element 40 as best seen in FIGS. 1,2, and 3 of the drawings.

In operation, the cover support bows 21 with adjustable extension elements 40 within as hereinbefore described are positioned between said supporting frame portions on said opposing side walls 14 and 15. The extension elements 40 abut the second angularly descending wall 29 of the channel portion 23 between the adjacent flange element 28 and base 22 of the support frame 18. Given that the overall length of the bow 21 with its attached extension elements 40 is greater than the known distance between opposing support frames 18 on respective side walls 14 and 15, the bows 21 deflect i.e. bow longitudinally forming an arcuate path P as best seen in FIG. 5 of the drawings.

It will be evident from the above description that the degree of bow deflection can be adjusted by incremental advancement of the extension elements 40 outwardly of their respective mounting channels S hereinbefore described.

It will be apparent to those skilled in the art that various changes and modifications may be made therein without departing from the spirit of the invention, therefore I claim:

1. An adjustable bow assembly for a tonneau cover assembly on a truck bed of the type having a front wall, an end wall, and an opposing sidewalls therebetween, said tonneau cover assembly comprising in combination a support frame on said truck walls, said support frame comprising an elongated base having opposing frame portions on said respective opposing sidewalls of said truck bed, an enclosed channel area extending from said base, a flange element on said channel area in vertically spaced relation to said base, adjustable bows comprising an elongated rail section, said rail section having first and second sidewalls in spaced parallel relation to one another, a transverse wall extending between said first and second sidewalls, each of said first and second sidewalls terminating in a transversely inwardly directed flange having a return flange thereon extending from each of said first and second sidewalls defining mounting channels therebetween, an inwardly projecting rib on said transverse wall, a pair of adjustable extension elements threadably secured within said respective mounting channels, means for advancement of said extension elements within said channels, and means for positioning said adjustable bows within said support frame.

2. The adjustable bow assembly of claim 1 wherein said adjustable extension elements are of a known cross-sectional dimension, and wherein said mounting channels define a known transverse area that is less than said known cross-sectional dimension of said adjustable extension elements.

3. The adjustable bow assembly of claim 1 wherein said means for positioning said adjustable bows with said adjustable extension elements being within said support frame portions comprises abutting said adjustable extension elements against said enclosed channel area between said flange element therefrom and said elongated base.

4. The adjustable bow assembly of claim 1 wherein said means for advancement of said extension elements from within said mounting channel comprises selective rotation said extension elements.

* * * * *